United States Patent [19]
Bailey et al.

[11] Patent Number: 5,348,107
[45] Date of Patent: Sep. 20, 1994

[54] PRESSURE BALANCED INNER CHAMBER OF A DRILLING HEAD

[75] Inventors: Thomas F. Bailey; Larry F. Moeller; John E. Campbell, all of Houston, Tex.

[73] Assignee: Smith International, Inc., Houston, Tex.

[21] Appl. No.: 23,499

[22] Filed: Feb. 26, 1993

[51] Int. Cl.$^5$ .............................................. E21B 19/08
[52] U.S. Cl. ................................... 175/162; 175/209; 166/84
[58] Field of Search ....................... 175/195, 162, 209; 285/363; 166/84

[56] References Cited

U.S. PATENT DOCUMENTS

| | | | |
|---|---|---|---|
| 2,243,340 | 5/1941 | Hild | 175/195 |
| 4,098,341 | 7/1978 | Lewis | 175/195 |
| 4,304,310 | 12/1981 | Garrett | 175/195 |
| 4,363,357 | 12/1982 | Hunter | 175/209 X |
| 4,367,795 | 1/1983 | Biffle | 175/195 |
| 4,383,577 | 5/1983 | Pruitt | 175/195 X |
| 4,423,776 | 1/1984 | Wagoner et al. | 175/195 X |
| 4,480,703 | 11/1984 | Garrett | 175/195 |
| 4,526,243 | 7/1985 | Young | 175/195 |
| 5,213,150 | 5/1993 | Bailey et al. | 175/195 X |

*Primary Examiner*—Ramon S. Britts
*Assistant Examiner*—Frank S. Tsay
*Attorney, Agent, or Firm*—Robert G. Upton

[57] ABSTRACT

A system for maintaining an optimum pressure balance within an inner chamber of a drilling head for improved seal life and integrity. The system maintains a pressure differential across the seals thereby preventing well fluids from contaminating the seals and improving their useful life. The drive ring of a drilling head is rotatably supported by a series of bearings disposed within a bearing chamber. The secondary chamber of the drilling head is sealed to prevent contaminants from entering the chamber and fouling the seals. The seals withstand the borehole well pressures to prevent the introduction of contaminants, by maintaining a pressure differential across the seals. The present system compensates for variations in the borehole pressure. A pressure compensator is in communication with the borehole to activate a lubricant pump for increasing lubricant pressure within the inner chamber in response to increased borehole pressures. A relief valve associated with the inner chamber relieves pressure in the seal chamber to maintain lubricant pressure at optimum levels when borehole pressure decreases for controlled operation of the seals. Additional check valves are included in the inner chamber to control the chamber pressure while preventing contamination of the lubricant.

15 Claims, 4 Drawing Sheets

PRESSURE BALANCED INNER CHAMBER OF A DRILLING HEAD

BACKGROUND OF THE INVENTION

I. Field of the Invention

This invention relates to a lubrication system for the inner chambers of a drilling head incorporating at least one rotating stripper rubber and, in particular, to a system for maintaining optimum pressure balance within the chambers relative to the wellbore to prevent contaminants from entering the chamber while also supplying lubricant across the seals for controlled operation of the seals and increased seal life.

II. Description of the Prior Art

With the increased use of rotating drilling heads which incorporate at least one stripper rubber that rotates with the kelly drive and therefore the drill string, a bearing assembly is needed to rotatably support the drive assembly. The stripper rubber is mounted to the drive ring and drive bushing which rotate within the drilling head. Disposed within an annular chamber between the drive ring and the outer wall of the drilling head housing is the bearing assembly. The bearing chamber is sealed at both ends to prevent contamination of the lubricant circulating through the chamber. Typical drilling heads also include a seal assembly associated with the drive ring which can fail if contaminated. These seals are associated with a secondary chamber formed by a series of fluid passageways. The bearing chamber and the seal chamber may or may not be in communication with each other. Lubricant may be continuously supplied to these chambers or a self-contained lubricant supply may be utilized. In any event, the purity and volume of the lubricant depends upon the integrity of the seals particularly those at the lower end of the chamber which are subject to the extreme pressures of the wellbore. The operating life of the drilling head can be dependent upon the integrity of the seals in order to prevent more costly damage.

In the prior known drilling heads, a substantial increase in wellbore pressure would force well fluids past the seals introducing contaminants to the chambers. Conversely, a sudden drop in wellbore pressure results in an increase in the pressure differential forcing lubricant out of the chamber past the seals. In a chamber with a fixed supply of lubricant this can reduce the operating life of the drilling head. Additionally, the integrity of the seals is compromised which can result in their failure as the wellbore pressure increases. Some prior known systems have attempted to electrically compensate for variations in pressure using electronic sensors and valves. However, such a system can be cost prohibitive and subject to failure in the grimy environment of a drilling head.

SUMMARY OF THE PRESENT INVENTION

The present invention overcomes the disadvantages of the prior known drilling heads by providing a system to compensate for variations in wellbore pressure to maintain an optimum lubricant pressure within the drilling head and across the seals for the chamber. By maintaining a slightly greater internal lubricant pressure across the seals to prevent contamination, the lubricant will feed past the seals to maintain thorough lubrication and improve seal operating life.

The pressure balance system for a drilling head utilizes a pressure compensator valve in fluid communication with the wellbore below the drive assembly of the drilling head. The pressure compensator has an axial valving member responsive to fluid pressure within the wellbore as well as the lubricant pressure within the inner seal chamber. As the valuing member moves within the compensator, a fluid path from an air compensator to a lubricant pump is opened or closed to selectively pump lubricant to the chamber in response to variations in wellbore pressure.

The body of the drilling head which houses the inner seal chamber and drive assembly, includes a series of lubricant passageways in communication with the lubricant pump. Some of these passageways lead to a packing gland which retains the lower seal assembly and includes its own series of lubricant passageways. At least one of these passageways is in communication with the wellbore and includes a pressure relief valve. When the pressure differential exceeds a predetermined limit lubricant pressure is relieved through the valve until an optimum valve is reached. Thus, in the event wellbore pressure drops, the optimum pressure differential will be maintained by bleeding lubricant pressure from the inner chamber. Additional passageways in the packing gland equalize lubricant pressure between seal members of the lower seal. Thus, pressure within the inner seal chamber will be constantly adjusted in proportion to the borehole pressure for optimum seal integrity and operation of the drilling head.

Other objects, features, and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the present invention when read in conjunction with the accompanying drawing, in which like reference characters refer to like parts throughout the views and in which.

DETAILED DESCRIPTION OF A PREFERRED EMBODIMENT OF THE PRESENT INVENTION

Figure 1:
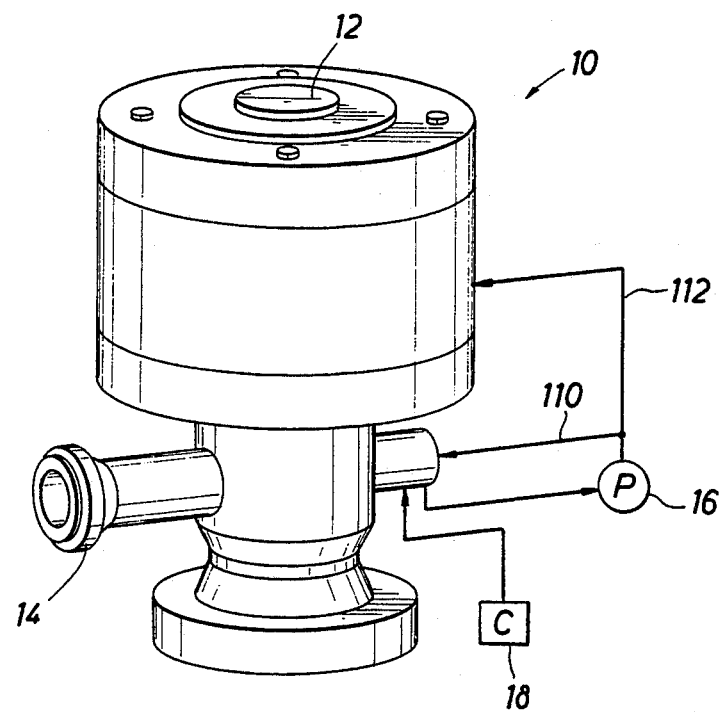
FIG. 1 is a perspective view of a drilling head incorporating the system for maintaining an optimum pressure balance within the inner chambers of the present invention.

Referring first to FIG. 1, there is shown a drilling head 10 embodying the pressure balanced inner chamber of the present invention. The drilling head 10 includes an axial throughbore 12 through which the drill string (not shown) is deployed. A diverter stem 14 is utilized to divert drilling mud from the drilling operation away from the drilling platform. In the present invention, the drilling head 10 is connected to a lubricant pump 16 for supplying low pressure lubricant to the bearing chamber and high pressure lubricant to the seal chamber as will be subsequently described. The pump 16 is operated using air from a compressor 18. As is well known, the drilling head is mounted to the casing of the wellbore proximate the rig floor for controlling deployment of the drill string while diverting drilling mud from the well.

Figure 2:
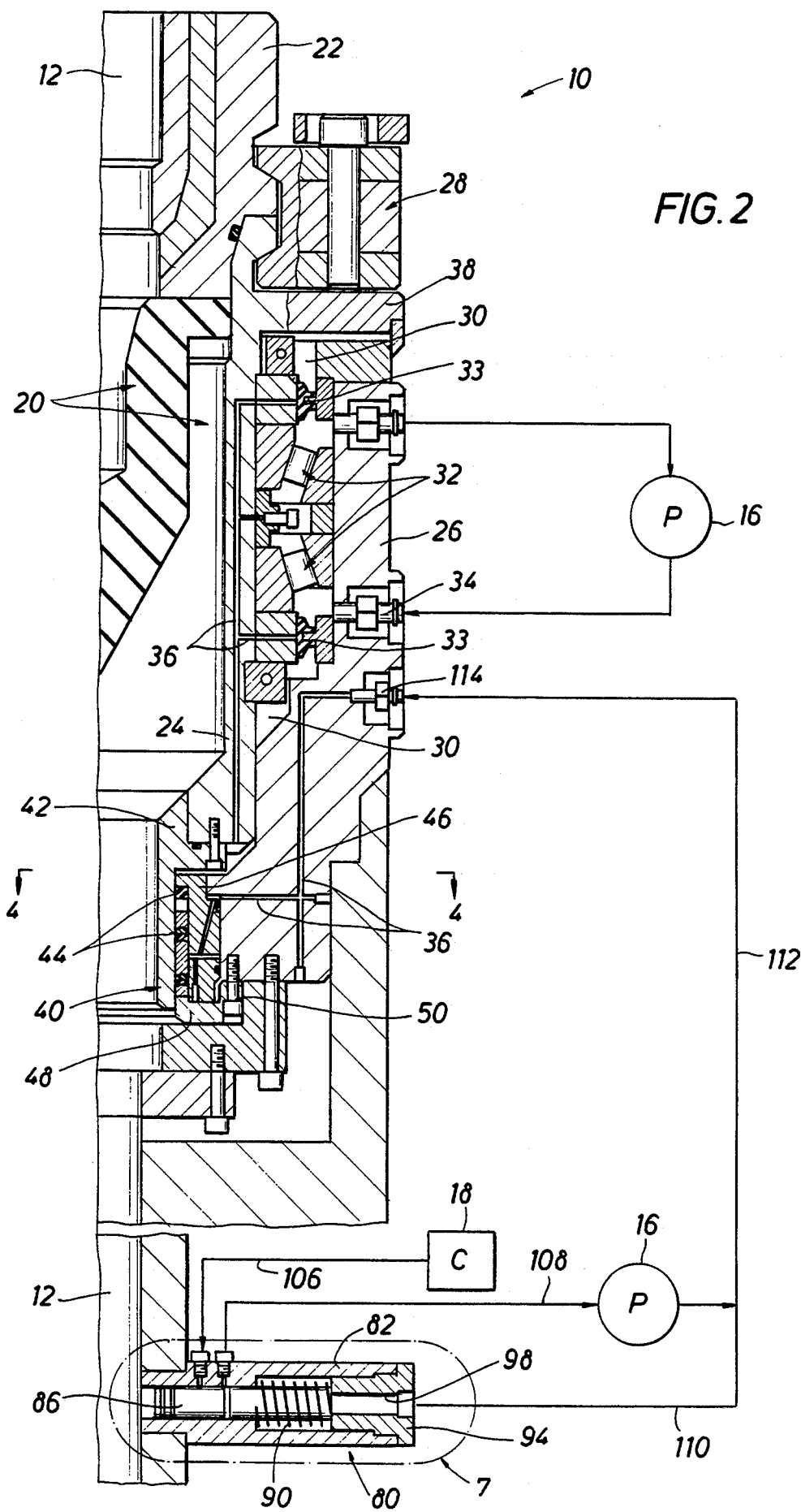
FIG. 2 is a partial cross-sectional view of the drilling head embodying the present invention.

Referring now to FIG. 2, the drilling head 10 includes a drive assembly 20 to facilitate rotation of the drilling string and its kelly while also allowing rotation of the stripper rubber 22 to maintain sealing contact with the drill string. The stripper rubbers 22 seal against the drill string to prevent drilling fluids from flowing out through the top of the drilling head 10 onto the rig floor thereby diverting the fluids to the diverter stem 14. The drive assembly 20 includes a drive bushing 22 and a drive ring 24 rotatably seated within an outer wall 26 of the drilling head 10. The drive bushing 22 and drive ring 24 are maintained within the drilling head 10 by a clamp assembly 28. The annulus formed between the drive ring 24 and the outer wall 26 forms a bearing chamber 30 housing a bearing assembly 32. The bearing assembly 32 rotatably supports the drive ring 24 and therefore must be well maintained with a clean supply of lubricant. An initial volume of lubricant may be injected into the bearing chamber 30 through a lubricant nipple 34 in the wall 26 of the drilling head 10. The bearing assembly 32 may consist of any variety of bearing members although roller bearings and thrust bearings are typically utilized in the bearing assembly 32. Means are also provided for circulating lubricant around and through the interior of the drilling head 10 such as by lubricant passageways 36 formed in the drive ring 24 and/or the outer wall 26 of the drilling head 10.

Figure 3:
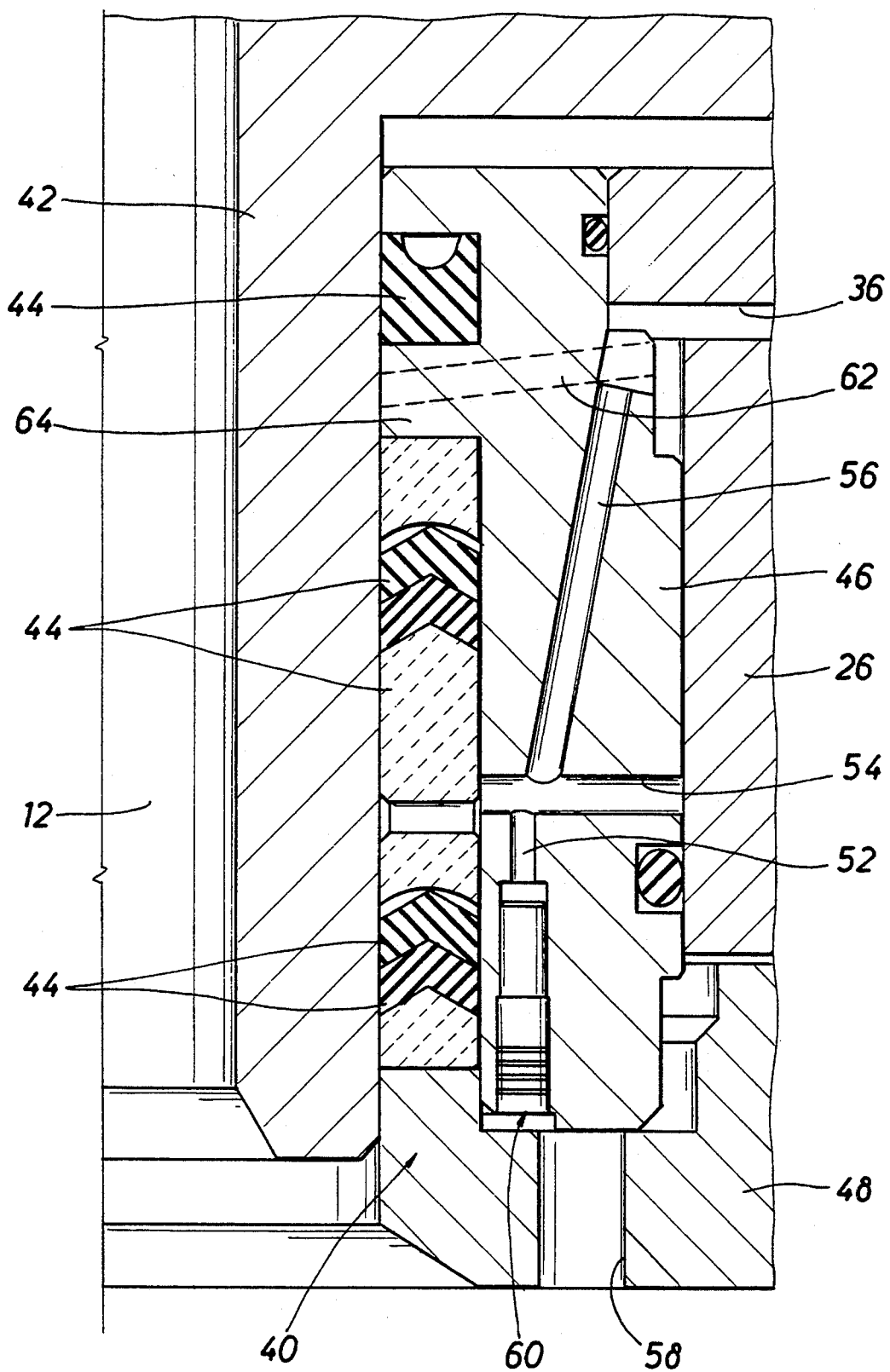
FIG. 3 is an enlarged cross-sectional view of the seal assembly.
Figure 4:
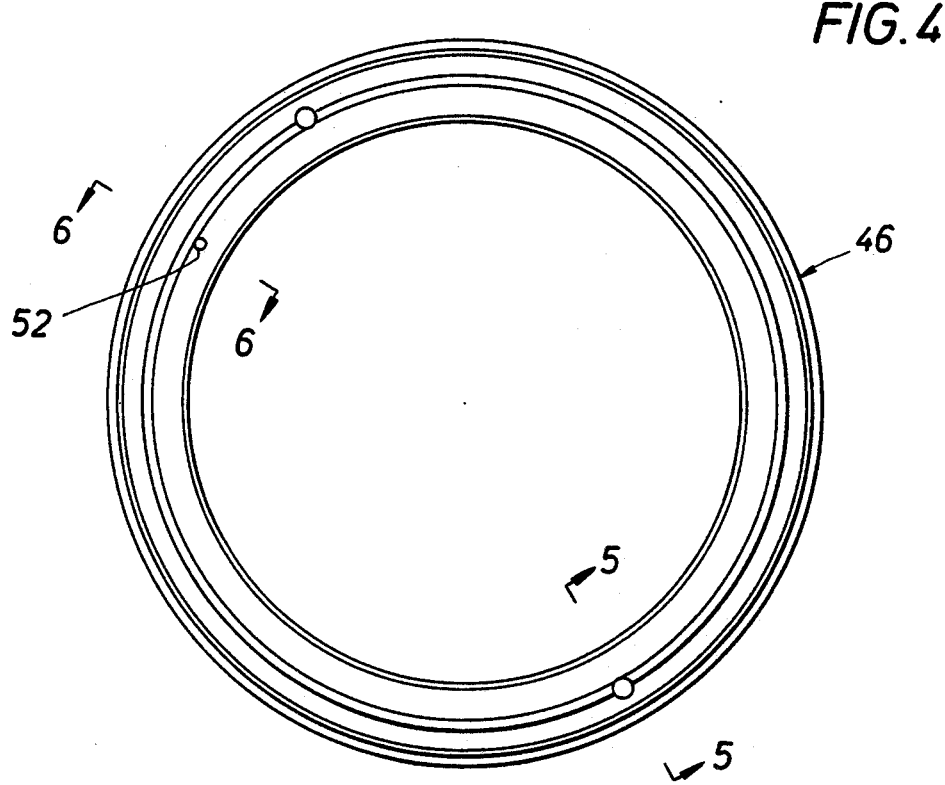
FIG. 4 is a plan view of the packing gland taken along lines 3—3 of FIG. 2.
Figure 5:
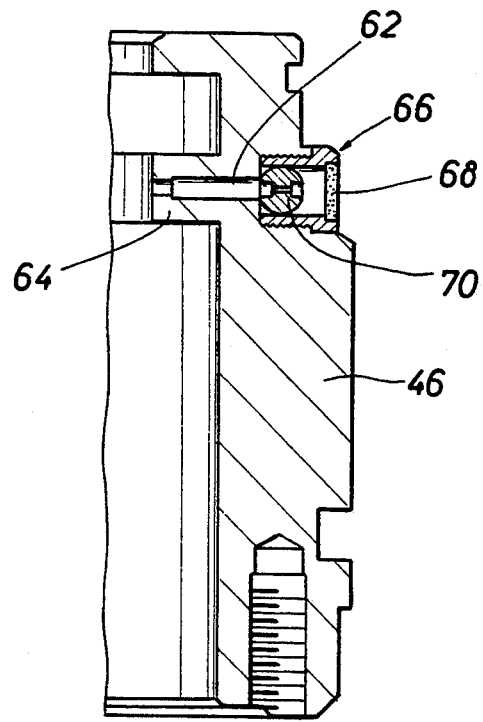
FIG. 5 is a partial cross-sectional view taken along lines 5—5 of FIG. 4.
Figure 6:
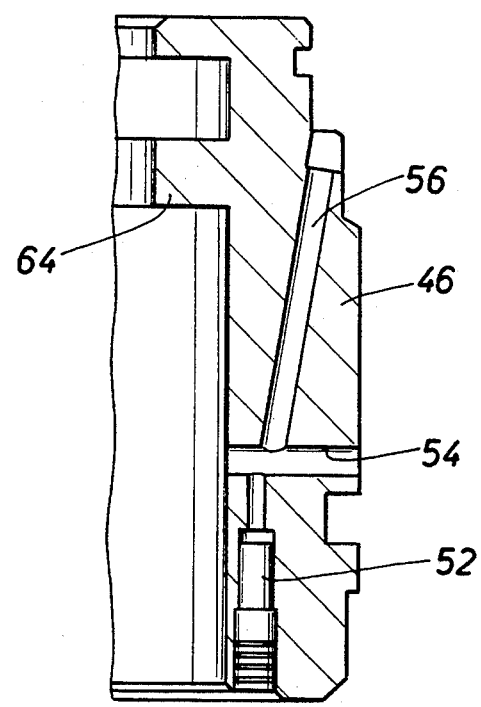
FIG. 6 is a partial cross-sectional view taken along lines 6—6 of FIG. 4.

The bearing chamber 30 is sealed at its upper and lower ends by seal elements 33. The interior passages of the drive assembly 20 are further sealed by a slinger 38 and at its lower end by a seal assembly 40. The seal assembly 40 is typically the weakest link for continuous operation of the drilling head 10 as they support the drive ring 24. The seal assembly 40 must be capable of withstanding extreme pressure variations since these seals are subject to the fluid pressures of the wellbore. As best shown in FIGS. 2 and 3, a lower sleeve 42 is attached to the lower end of the drive ring 24 in order to positionally capture the seal assembly 40 against the outer wall 26 of the drilling head 10. The seal assembly includes a plurality of seal elements 44 carried by a packing gland 46. A compression flange 48 attached to the outer wall 26 by cap screw 50 prevents axial movement of the seal assembly 40 while sealingly compressing the seal elements 44.

Referring now to FIGS. 3 through 6, the packing gland 46 includes a plurality of passageways to circulate lubricant to the seal elements 44 while also maintaining an optimum pressure differential in accordance with the present invention. These passageways are in fluid communication with the lubricant passageways 36 such that lubricant will freely circulate to the seals 44. By maintaining an optimum supply of lubricant to the seals 44 the life of the seals is increased resulting in fewer shut downs of the drilling head 10. The integrity of the seals 44 is important in order to prevent contaminants from entering the lubricant passageways 36.

The packing gland 46 includes a longitudinal passageway 52 in communication with a transverse bore 54 and a crossing passageway 56. The longitudinal passageway 52 is in fluid communication with the wellbore 12 through the lower end of the packing gland 46 and by way of an opening 58 in the compression flange 48. The transverse bore 54 is in fluid communication with the seal elements 44 to circulate lubricant to the seals 44. The crossing passageway 56 is in fluid communication with the lubricant passageways 36 at the upper end of the packing gland 46. Thus, lubricant from the lubricant passageways 36 will flow to the seals 44 as well as exteriorly of the seal assembly 40 to relieve fluid pressure within the inner chamber 30. In order to control the relief of pressure from the chamber 30, a relief valve 60 having preselected characteristics is positioned within the longitudinal passageway 52. In a preferred embodiment, the relief valve 60 is selected to relieve fluid pressure from the passageway 36 when such pressure exceeds the borehole pressure by 100 psi as will be subsequently described.

Circumferentially spaced from the relief valve orifice 52 are secondary transverse passageways 62 providing fluid communication between the lubricant passageways 36 and the seal elements 44. Specifically the secondary passageways 62 direct lubricant to the flange area 64 of the packing gland 46 between a singular seal element and the seal stack. The secondary passageways 62 are provided with a filter/orifice plug 66 to restrict the flow of lubricant through the secondary passageways 62, specifically the backflow of well fluids therethrough. If any backflow does occur, a filter element 68 will remove the limited number of contaminants which could flow into the secondary passageway 62. A restricted orifice 70 of the plug 66 will severely limit the flow of fluids in either direction through the secondary passageway 62.

Figure 7:
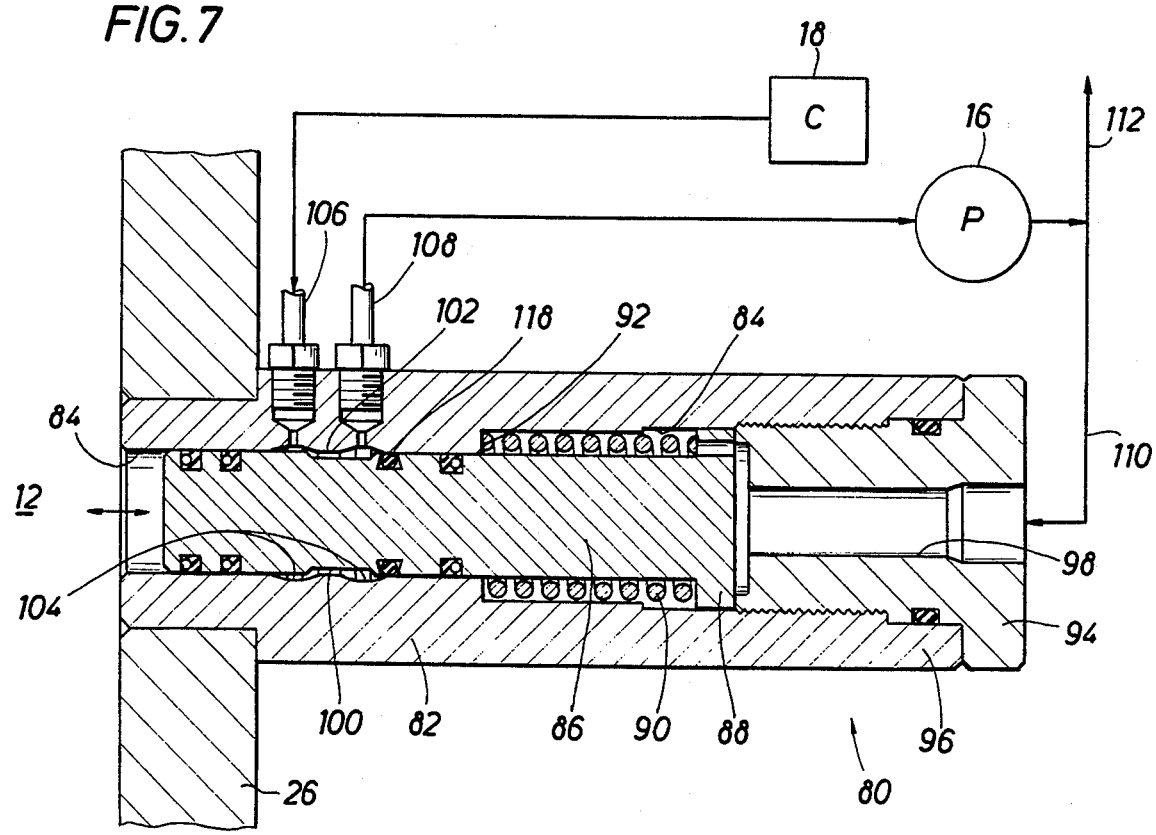
FIG. 7 is a cross-sectional view of the pressure compensator valve.

Whereas the relief valve 60 and the passageways of the packing gland 46 operate to relieve fluid pressure from within the bearing chamber 30 when such pressure exceeds the wellbore pressure by a predetermined level, means must be provided for increasing fluid pressure within the chamber 30 to compensate for increased wellbore pressures. Referring to FIGS. 2 and 7, a pressure compensator valve 80 is mounted to the drilling head 10 in communication with the wellbore 12 in order to measure the wellbore fluid pressure. The valve 80 includes a body 82 having an axial throughbore 84. A valuing member 86 is positioned within the throughbore 84 for reciprocal movement therein in response to variations in fluid pressure as will be subsequently described. The valuing member 86 includes an end shoulder 88. A spring 90 for biasing the valuing member 86 is positioned in the throughbore between the end shoulder 88 of the valuing member 86 and a shoulder 92 formed in the valve body 82. A cap 94 is threadably received in the outer end 96 of the body 82 to restrict outward movement of the valuing member 86. The cap 94 includes a fluid passageway 98 to facilitate fluid communication with the throughbore 84. The valuing member 86 includes a peripheral groove 100 which cooperates with the wall of the throughbore 84 to form an annulus 102. Formed in the wall of the throughbore 84 proximate the annulus 102 are a pair of parallel grooves 104 which are in direct communication with exterior air lines 106 and 108. The inlet air line 106 is connected to the compressor 18 which supplies air to the valve 80. The outlet air line 108 selectively directs air which passes through the valve 80 from the compressor 18 to the lubricant pump 16 in accordance with the position of the valuing member 86 within the valve 80. The pump 16 pumps lubricant through line 110 to the fluid passageway 98 of the valve 80 and through line 112 to a lubricant nipple 114 on the drilling head 10. Since the valve throughbore 84 communicates with both the wellbore 12 and lubricant line 110 the valuing member 86 will be axially displaced in accordance with the pressure differential between the wellbore 12 and the lubricant line 110 and therefore the inner chamber 30. The characteristics of the spring 90 can be chosen to fine tune the operating characteristics of the valve 80 in accordance with the desired pressure differential.

The valve 80 is shown in FIG. 7 in the open position whereby wellbore pressure has pushed the valuing member 86 outwardly to open the annulus 102 allowing air flow from inlet 106 to outlet 108. In response, the pump 16 will pump lubricant to the passageway 98 increasing the pressure until the fluid pressure and biasing of the spring 90 overcome the wellbore pressure moving the valuing member 86 inwardly until O-ring seal 118 closes the path between the inlet 106 and 108 preventing circulation of air to the pump 16 thereby stopping further lubricant pumping.

The lubricant line 112 connected to nipple 114 supplies lubricant from the pump 16 to the lubricant passageways 36 and the seal assembly 40. Since lubricant lines 110 and 112 are both directly connected to the pump 16, the lubricant pressure within the inner passageways 36 and across the seal assembly 40 will be equal to the pressure applied to the compensator valve 80 and therefore directly proportional to the wellbore pressure by a predetermined value. As has been previously noted, it is desirable to maintain the lubricant pressure across the seal assembly 40 approximately 100 psi above the wellbore pressure. However, a pressure differential of 10 psi to 150 psi is acceptable to protect the integrity of the seals 44 and prevent contamination. Thus, once the lubricant pressure exceeds the wellbore pressure by the predetermined value the valuing member 86 will close off the annulus 102 shutting down the pump 16. If wellbore pressure increases beyond the desired level in proportion to the lubricant pressure, the valuing member 86 will move outwardly opening the annulus 102 and actuating the lubricant pump 16.

In the event wellbore pressure decreases to increase the pressure differential, the valve 60 in the packing gland 46 will relieve lubricant pressure until the desired differential is reached. Thus, the present invention regulates the pressure differential between the inner chamber 30 and the wellbore 12 both by relieving lubricant pressure through the relief valve 60 and by increasing lubricant pressure through the pressure compensator valve 80 and the lubricant pump 16.

The foregoing detailed description has been given for clearness of understanding only and no unnecessary limitations should be understood therefrom as some modifications will be obvious to those skilled in the art without departing from the scope and spirit of the appended claims.

What is claimed is:

1. A system for maintaining a predetermined fluid pressure differential within a chamber of a drilling head in relation to the downhole fluid pressure within a wellbore associated with said drilling head, said system comprising:

means for relieving fluid pressure from said chamber in response to an increase in said fluid pressure differential above a predetermined value; and means for increasing fluid pressure within said chamber in response to a decrease in said fluid pressure differential below a predetermined value, said means for increasing fluid pressure includes a fluid pump in fluid communication with said chamber to inject fluid until said fluid pressure differential increases to said predetermined value, said fluid pump having means for detecting said fluid pressure differential, said means for detecting said fluid pressure differential comprises a pressure compensator valve in fluid communication with the wellbore for detecting downhole fluid pressure and with said chamber for detecting fluid pressure within said chamber, said compensator valve opening and closing to operate said fluid pump in response to variations in said fluid pressure differential.

2. The system as defined in claim 1 wherein said compensator valve includes a valving member reciprocatingly movable in response to variations in said pressure differential, movement of said valving member in a first direction within said compensator valve opening a fluid path for operation of said fluid pump and movement of said valving member in a second direction within said compensator valve closing said fluid path to shut down said fluid pump.

3. The system as defined in claim 2 wherein said fluid path comprises an air inlet line in communication with an air supply, an air outlet line in communication with said fluid pump to control operation of said pump, and a selectively closable annulus connecting said air inlet line and said air outlet line wherein movement of said valuing member in said second direction seals off said annulus interrupting air flow from said inlet to said outlet.

4. The system as defined in claim 1 wherein said means for relieving fluid pressure from said chamber comprises a relief valve mounted within the drilling head in fluid communication with said chamber, said relief valve relieving fluid pressure from said chamber when said fluid pressure differential is exceeded.

5. The system as defined in claim 4 wherein said chamber includes a plurality of fluid passageways for circulating said fluid within said drilling head, said relief valve positioned in a fluid passageway in communication with said chamber.

6. The system as defined in claim 5 and further comprising a seal assembly within said drilling head for sealing said chamber against the downhole fluid pressure.

7. The system as defined in claim 6 wherein at least one of said fluid passageways is in communication with said seal assembly to direct said fluid within said drilling head to said seal assembly thereby maintaining an optimum fluid pressure differential across said seal assembly thereby maintaining the integrity of said seal assembly and prevent wellbore contaminants from entering said chamber.

8. The system as defined in claim 5 wherein at least one of said fluid passageways is in communication with said fluid pump whereby fluid injected by said fluid pump is introduced into said chamber.

9. The system as defined in claim 4 wherein said relief valve opens to relieve fluid pressure from said chamber when said pressure differential exceeds 10 psi.

10. The system as defined in claim 1 wherein said pressure compensator valve opens to operate said fluid pump when said pressure differential decreases below 10 psi.

11. The system as defined in claim 4 wherein said relief valve and said pressure compensator valve operate to maintain said pressure differential between 150 psi and 10 psi.

12. A system for maintaining a predetermined fluid pressure differential within an inner chamber of a drilling head in relation to the downhole fluid pressure within a wellbore associated with said drilling head, said system comprising:

means for relieving fluid pressure from said chamber in response to an increase in fluid pressure differential above a predetermined first value, said fluid pressure being relieved into said wellbore: and a pressure compensator valve operatively connected to a fluid pump for increasing fluid pressure within said chamber in response to a decrease in said fluid pressure differential below a predetermined second value, said fluid pump is in fluid communication with said chamber to inject fluid until said fluid pressure differential exceeds said second value and said pressure compensator valve for detecting said fluid pressure within said chamber, said pressure compensator valve in fluid communication with the wellbore for detecting downhole fluid pressure, said compensator valve opening and closing to operate said fluid pump in response to variations in said fluid pressure differential, said compensator valve includes a valuing member reciprocatingly movable in response to variations in said pressure differential, movement in said valuing member in a first direction within said compensator valve opening a fluid path for operation of said fluid pump and movement of said valuing member in a second direction within said compensator valve closing said fluid path to shut down said fluid pump, said pressure compensator valve detecting said fluid pressure differential and selectively operating said fluid pump to maintain said fluid pressure differential.

13. The system as defined in claim 12 wherein said means for relieving fluid pressure from said chamber comprises a relief valve mounted within the drilling head in fluid communication with said chamber and the wellbore, said relief valve relieving fluid pressure from said chamber when said predetermined first fluid pressure differential is exceeded.

14. In a drilling head mounted to a wellbore and adapted to receive a drill string therethrough, the drilling including a drive assembly rotatably supported by a bearing assembly and an inner chamber having a plurality of seals, said inner chamber having lubricant flowing therethrough at a predetermined fluid pressure, the improvement comprising;

a system for maintaining a predetermined fluid pressure differential within said chamber in response to variations in wellbore fluid pressure in order to maintain the integrity of said seals of said chamber and prevent contaminants from entering said chamber, said system including first means for relieving fluid pressure from said chamber in response to an increase in said fluid pressure differential above a predetermined first value and second means for increasing fluid pressure within said chamber by injecting additional lubricant in response to a decrease in said fluid pressure differential below a predetermined second value, said first means comprises a relief valve in communication with said chamber, said valve relieving fluid pressure from said chamber when said first value is exceeded.

15. The improvement as defined in claim 14 wherein said second means comprises a pressure compensator valve operatively connected to a lubricant pump for selectively injecting additional lubricant into said chamber, said pressure compensator valve in fluid communication with said wellbore to detect said wellbore fluid pressure and with said chamber to detect said fluid pressure within said chamber, said compensator valve responding to a decrease in said fluid pressure differential below said second value to operate said lubricant pump to increase fluid pressure within said chamber.

* * * * *